United States Patent
Asano et al.

(10) Patent No.: US 9,677,152 B2
(45) Date of Patent: Jun. 13, 2017

(54) METHOD FOR RECOVERING LITHIUM

(75) Inventors: Satoshi Asano, Ehime (JP); Hitoshi Ishida, Ehime (JP); Takayuki Nakai, Ehime (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 387 days.

(21) Appl. No.: 14/376,492

(22) PCT Filed: Feb. 10, 2012

(86) PCT No.: PCT/JP2012/053159
§ 371 (c)(1),
(2), (4) Date: Aug. 4, 2014

(87) PCT Pub. No.: WO2013/118300
PCT Pub. Date: Aug. 15, 2013

(65) Prior Publication Data
US 2015/0013499 A1    Jan. 15, 2015

(51) Int. Cl.
*C22B 26/00* (2006.01)
*C22B 26/12* (2006.01)
(Continued)

(52) U.S. Cl.
CPC ............ *C22B 26/12* (2013.01); *C22B 3/0005* (2013.01); *C22B 3/44* (2013.01); *C22B 7/006* (2013.01);
(Continued)

(58) Field of Classification Search
CPC ......... C22B 3/0005; C22B 3/44; C22B 7/006; C22B 26/12; H01M 10/052; H01M 10/54; C01B 25/10; C01D 15/005
(Continued)

(56) References Cited

U.S. PATENT DOCUMENTS 3,380,803 A * 4/1968 Jache .................. C01D 15/005
423/301
5,378,445 A * 1/1995 Salmon ................ C01B 25/455
423/301
(Continued)

FOREIGN PATENT DOCUMENTS

CN    1451771 A    10/2003
EP    2305841 A1    4/2011
(Continued)

OTHER PUBLICATIONS

Apr. 24, 2012 International Search Report issued in International Application No. PCT/JP2012/052537.
(Continued)

*Primary Examiner* — Steven Bos
(74) *Attorney, Agent, or Firm* — Oliff PLC

(57) ABSTRACT

To provide a method for recovering lithium, that is capable of efficiently recovering lithium without containing impurities, such as phosphorus and fluorine, from a lithium-containing solution containing lithium hexafluorophosphate and separated from a lithium ion battery. In the present invention, alkali hydroxide is added to the lithium-containing solution and the solution is made to have pH 9 or more, a precipitate of a phosphate and a fluoride salt is formed, the formed precipitate is separated and removed, and then lithium is recovered from filtrate.

7 Claims, 1 Drawing Sheet

(51) Int. Cl.
  *C22B 3/26*  (2006.01)
  *C22B 3/44*  (2006.01)
  *C22B 7/00*  (2006.01)
  *H01M 10/54*  (2006.01)
  *H01M 10/052*  (2010.01)

(52) U.S. Cl.
  CPC ......... *H01M 10/052* (2013.01); *H01M 10/54* (2013.01); *Y02P 10/234* (2015.11); *Y02W 30/84* (2015.05)

(58) Field of Classification Search
  USPC .......................................... 423/179.5; 429/49
  See application file for complete search history.

(56) References Cited

U.S. PATENT DOCUMENTS

| | | | |
|---|---|---|---|
| 6,524,737 B1 * | 2/2003 | Tanii | ........................ C22B 7/005 429/49 |
| 2011/0072936 A1 | 3/2011 | Narisako et al. | |

FOREIGN PATENT DOCUMENTS

| | | |
|---|---|---|
| JP | A-05-017832 | 1/1993 |
| JP | A-06-346160 | 12/1994 |
| JP | A-07-207349 | 8/1995 |
| JP | A-08-022846 | 1/1996 |
| JP | A-10-330855 | 12/1998 |
| JP | A-2000-030741 | 1/2000 |
| JP | 2000-106221 * | 4/2000 |
| JP | A-2001-023704 | 1/2001 |
| JP | A-2003-157913 | 5/2003 |
| JP | A-2005-197149 | 7/2005 |
| JP | A-2007-122885 | 5/2007 |
| JP | A-2007-207630 | 8/2007 |
| JP | A-2011-074410 | 4/2011 |
| JP | A-2011-168858 | 9/2011 |
| JP | A-2012-041621 | 3/2012 |
| JP | A-2012-072464 | 4/2012 |
| WO | 0108245 A1 | 2/2001 |

OTHER PUBLICATIONS

Oct. 15, 2015 Extended European Search Report issued in Patent Application No. 12868180.6.

Aug. 21, 2015 Office Action issued in Chinese Patent Application No. 201280069426.1.

Castillo et al., "Advances in the recovering of spent lithium battery compounds," Journal of Power Sources, vol. 112, 2002, pp. 247-254.

Xu et al., "A review of processes and technologies for the recycling of lithium-ion secondary batteries," Journal of Power Sources, vol. 177, 2008, pp. 512-527.

* cited by examiner

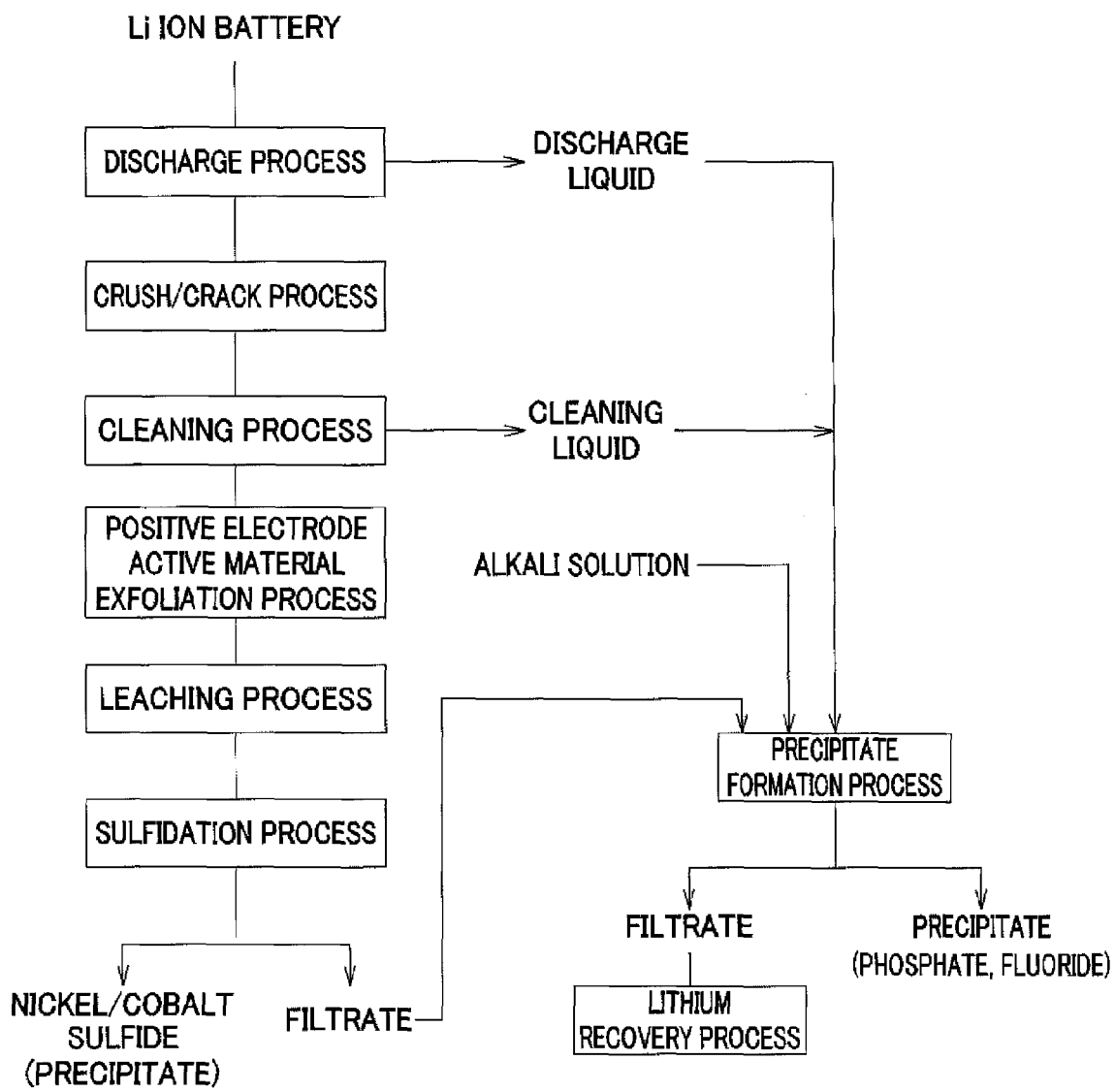

METHOD FOR RECOVERING LITHIUM

TECHNICAL FIELD

The present invention relates to a method for recovering lithium from a lithium ion battery, and especially relates to a method for recovering lithium, which is capable of preventing contamination by phosphorus and fluorine and recovering lithium of high purity from a lithium-containing solution that contains lithium hexafluorophosphate.

BACKGROUND ART

Effective use of electric power is required for recent global warming tendency. Secondary batteries for electric power storage are expected as one means, and from the standpoint of prevention of air pollution, early practical application of large secondary batteries is expected as an automobile power source. Further, a demand of small secondary batteries has been steadily increasing especially in association with spread and performance enhancement of electrical devices, such as digital cameras and mobile phones, as back-up sources of computers and power sources of small household electrical appliances.

As these secondary batteries, a secondary battery having performance corresponding to a device to be used is required, and typically, lithium ion batteries are mainly used.

In the lithium ion battery, a negative material formed such that a negative active material of graphite, or the like is fixed to a negative substrate made of a copper foil in a metal packaging can of aluminum, iron, or the like, a positive electrode material formed such that a positive electrode active material of lithium nickel oxide, lithium cobalt oxide, or the like is fixed to a positive electrode substrate made of an aluminum foil, a current collector made of aluminum or copper, a separator made of a resin film, such as a polypropylene porous film, an electrolyte solution, an electrolyte, and the like are enclosed.

By the way, establishment of measures against environment pollution with used lithium ion batteries is strongly required for an expanding demand of lithium ion batteries, and recovery and effective use of valuable metals have been examined.

As a method for recovering the valuable metals from a lithium ion battery having the above structure, for example, dry melting treatment and incineration treatment for discharging the battery and decomposing and removing a solvent, as described in Patent Literature 1, are often used. Patent Literature 1 discloses pretreatment to roast a lithium ion battery at a temperature of 350° C. or more, to perform pulverization, and then to perform screening.

However, in the case of dry treatment like the technology described in Patent Literature 1, consumption of energy and exhaust gas treatment are problems. Further, especially, in a melting method, lithium is made into slag and becomes unrecoverable, and in a roasting method, contained phosphorus and fluorine are fixed as a water-insoluble phosphate and fluoride. Lithium, cobalt, nickel, or the like that are valuable metals are contaminated. As a result, separation and refinement become difficult. Therefore, direct regeneration of lithium, cobalt, and nickel recovered in dry roasting treatment for battery materials is difficult in terms of quality, and effective reuse cannot be achieved.

Meanwhile, methods of recovering the valuable metals by wet treatment have been proposed. However, even in such methods using wet treatment, dry treatment is partly used, and realization of low cost is difficult because of complexity of a treatment process. Therefore, the valuable metals cannot be efficiently recovered.

Especially, regarding lithium of a valuable metal, there is a problem that impurities, such as phosphorus and fluorine, are mixed in, and thus high-quality lithium cannot be efficiently recovered in the form of a simple substance. To be specific, a lithium ion battery contains, as an electrolyte, lithium hexafluorophosphate ($LiPF_6$) and the like that constitute lithium that is a valuable metal. This lithium hexafluorophosphate has a hydrolysis reaction through wet treatment, and forms a precipitate in the forms of lithium phosphate ($Li_3PO_4$) and lithium fluoride (LiF), and lithium cannot be efficiently recovered in the form of a simple substance.

While hexafluorophosphate ions in an electrolyte solution do not form slightly soluble salts with metal ions other than potassium and aluminum, the hexafluorophosphate ions form the slightly soluble salts with the majority of metal ions when hydrolyzed and changed into phosphate ions and fluoride ions. When separation and refinement treatment is performed in the coexistence of these hydrolysates, ions of these hydrolysates are precipitated on products, resulting in quality failure.

As a method for removing hexafluorophosphate ions, for example, Patent Literature 2 describes a method for adding potassium fluoride and ammonium fluoride, forming slightly soluble hexafluorophosphate and lithium fluoride, and separating the hexafluorophosphate and lithium fluoride as a precipitate. However, the technology described in Patent Literature 2 has problems that phosphorus, fluorine, and lithium are recovered as a coprecipitation mixture, already hydrolyzed phosphate ions cannot be separated, and excessively added fluoride is remained in mother liquor.

Further, Patent Literature 3 discloses a method for absorbing hexafluorophosphate ions with a basic ion exchange resin, preferably a weak basic ion exchange resin. However, because behavior of the already hydrolyzed phosphate ions and fluoride ions is different, there is a limit to remove the phosphate ions and the fluoride ions at the same time, and even the technology of Patent Literature 3 cannot sufficiently remove the phosphate and the fluoride.

Meanwhile, Patent Literature 4 discloses a method for remaining hexafluorophosphate ions in an extraction residual liquid by using a positive ion exchange-type acidic extractant, and selectively extracting and separating only lithium ions. However, even the technology described in Patent Literature 4 has problems that, in a process of adjusting a solution to have necessary pH for extraction, the hexafluorophosphate ions are hydrolyzed and a precipitate of lithium phosphate and lithium fluoride is generated, becomes crud, and is physically mixed in an extraction solvent, and lithium is contaminated.

CITATION LIST

Patent Literature

Patent Literature 1: JP H06-346160 A
Patent Literature 2: JP 2000-030741 A
Patent Literature 3: JP 2007-207630 A
Patent Literature 4: JP 2007-122885 A

SUMMARY OF INVENTION

Technical Problem

Therefore, the present invention has been proposed in view of the foregoing, and an objective is to provide a method for recovering lithium, which is capable of recovering lithium without contamination by phosphorus and fluorine from a lithium-containing solution containing lithium hexafluorophosphate and separated from a lithium ion battery.

Solution to Problem

As a result of diligent examination for achievement of the above objective, the inventors have found out that they can recover lithium without contamination by phosphorus and fluorine by adding alkali hydroxide to a lithium-containing solution containing lithium hexafluorophosphate and separated from a lithium ion battery to raise pH, forming a precipitate of a phosphate and a fluoride salt, and separating and removing the precipitate, and the inventors have completed the present invention.

That is, the present invention includes, in a method for recovering lithium from a lithium-containing solution containing lithium hexafluorophosphate separated from a lithium ion battery, a precipitate formation process of adding alkali hydroxide to the lithium-containing solution to cause the solution to have pH 9 or more, and forming a precipitate of a phosphate and a fluoride salt, and a lithium recovery process of separating and removing the precipitate formed in the precipitate formation process, and then recovering lithium from filtrate.

Advantageous Effects of Invention

According to the present invention, by adding of alkali hydroxide to the lithium-containing solution containing lithium hexafluorophosphate to raise pH, the precipitate of a phosphate and a fluoride salt can be efficiently separated and removed, and lithium without contamination by phosphorus and fluorine can be recovered from the filtrate.

BRIEF DESCRIPTION OF DRAWINGS

FIG. 1 is a diagram illustrating a process of recovering lithium from a lithium-containing solution separated from a lithium ion battery.

DESCRIPTION OF EMBODIMENTS

Hereinafter, a method for recovering lithium according to the present invention will be described in detail in the following order with reference to the drawing.
1. An outline of the present invention
2. A method for recovering valuable metals from a lithium ion battery
2-1. Recovery of nickel and cobalt
2-2. Recovery of lithium
3. Other embodiments
4. Examples 1. An Outline of the Present Invention The present invention is a method for recovering lithium that is a valuable metal from a lithium ion battery, and is a method for preventing contamination of mixing in of impurities of phosphorus (P), fluorine (F), and the like, and efficiently recovering lithium from a lithium-containing solution that contains lithium hexafluorophosphate and is separated from the lithium ion battery, to be more specific, from a lithium-containing solution, such as process liquids including a discharge liquid and a cleaning liquid discharged after slurry is filtered in a process of recovering valuable metals from the lithium ion battery, or filtrate of post-sulfidation process to generate nickel and cobalt as sulfides.

In recovering valuable metals from a lithium ion battery, treatment to discharge a used lithium ion battery by using a discharge liquid, treatment to clean dismantled objects of the battery by using a cleaning liquid, and the like are performed. After the treatments, a solution of the discharged liquid and the cleaning liquid discharged after slurry is filtered contains lithium in the form of lithium hexafluorophosphate ($LiPF_6$) that is a component of an electrolyte that constitutes the lithium ion battery. Further, the filtrate of post-sulfidation process to precipitate a nickel/cobalt mixed sulfide from a leachate obtained by leaching a positive electrode active material of the lithium ion battery also contains lithium in the form of lithium hexafluorophosphate, and the like. Therefore, it is desirable to efficiently recover lithium from the lithium-containing solution, such as the process liquids including the discharged liquid and the cleaning liquid separated from the lithium ion battery, or the filtrate of post-sulfidation process, and to use the recovered high-quality lithium again as an electrolyte component in manufacturing of a battery.

However, the lithium hexafluorophosphate dissolved in the lithium-containing solution does not form a slightly soluble salt with metal ions in a case of the form of hexafluorophosphate ions. However, when the hexafluorophosphate ions are hydrolyzed and are changed into phosphate ions and fluoride ions, the phosphate ions and the fluoride ions form slightly soluble salts with the majority of metal ion. Accordingly, these phosphate ions and fluoride ions form a precipitate of a phosphate ($Li_3PO_4$) and a fluoride (LiF) with lithium that is a valuable metal to be recovered. Therefore, even if a water-soluble carbonate, or the like is added to the lithium-containing solution to form a precipitate of a lithium carbonate, and the separation and refinement treatment of lithium is performed, the precipitate is in a state where phosphorus and fluorine are coprecipitated, resulting in quality failure, and separated lithium cannot be used as a component of a positive electrode active material again.

Therefore, the present invention uses a characteristic that the hexafluorophosphate ions in an electrolyte solution are stable in the vicinity of neutrality but are hydrolyzed into phosphate ions and fluoride ions in a strong acid region or in a strong alkaline region in an electrolyte solution. First, the hexafluorophosphate ions in the solution are hydrolyzed into the phosphate ions and the fluoride ions by raising pH of the lithium-containing solution. Because these phosphate ions and the fluoride ions caused by hydrolysis form slightly soluble salts with metal ions, the precipitate of the formed slightly soluble salts is separated and removed, and lithium contained in the filtrate is then recovered.

As described above, using the effect of partial precipitate, the present invention decreases impurities by partially raising pH before separating and recovering lithium as a lithium carbonate, and the like, and forming and separating a lithium phosphate, a lithium fluoride, or salts of coexisting impurities. According to the present invention, the impurities of phosphorus and fluorine are removed from the lithium-containing solution prior to separation and recovery of lithium. Therefore, lithium of high purity, in which phosphorus and fluorine are not mixed in, can be effectively recovered.

Hereinafter, an embodiment (hereinafter, referred to as "present embodiment") related to a method for recovering valuable metals from a lithium ion battery, to which the present invention is applied, will be further described in detail.

2. A Method for Recovering Valuable Metals from a Lithium Ion Battery

First, a method for recovering valuable metals from a lithium ion battery according to the present embodiment will be herein described with reference to the process diagram illustrated in FIG. 1. As illustrated in FIG. 1, the method for recovering valuable metals includes a discharge process, a crush/crack process, a cleaning process, a positive electrode active material exfoliation process, a leaching process, and a sulfidation process. Then, as a method for recovering lithium, a precipitate formation process of using a lithium-containing solution, such as process liquids including a discharge liquid and a cleaning liquid discharged in the discharge process and the cleaning process and separated from a lithium ion battery, or filtrate of post-sulfidation process, adding an alkali to the lithium-containing solution to raise pH, and forming precipitate of a phosphate and a fluoride salt, and a lithium recovery process of recovering lithium from filtrate from which the precipitate formed in the precipitate formation process has been removed. Hereinafter, a process of recovering nickel and cobalt from a lithium ion battery, and a process of recovering lithium from a lithium-containing solution, such as a discharge liquid and a cleaning liquid discharged in the process of recovering nickel and cobalt will be described in order.

<2-1. Recovery of Nickel and Cobalt>
(Discharge Process)

In the discharge process, when valuable metals are recovered from a used lithium ion battery, the battery is discharged prior to dismantlement of the used battery. Because it is dangerous if the battery is in a charged state when dismantled by being crushed and cracked in the crush/crack process described below, the battery is discharged and is made harmless.

In the discharge process, a discharge liquid, such as a sodium sulfate solution or a sodium chloride solution, is used, and the used battery is discharged by being immersed in the solution. Slurry is filtered from the discharge liquid after the discharge treatment, and the discharge liquid is discharged. In the discharged discharge liquid, components of an electrolyte and an electrolyte solution that constitute the lithium ion battery are liquated in association with the discharge treatment. That is, the discharged liquid after the treatment, which contains lithium of the electrolyte, the electrolyte solution, and the like, is discharged.

(Crush/Crack Process)

In the crush/crack process, the used lithium ion battery that has been discharged and made harmless is dismantled by being crushed and cracked.

In the crush/crack process, the harmless battery is dismantled into an appropriate size by using a normal crusher or cracking machine. Further, the packaging can is cut off and the internal positive electrode material and negative material can be separated and dismantled. It is preferable to cut off separated portions into a more appropriate size.

(Cleaning Process)

In the cleaning process, the electrolyte solution and the electrolyte are removed by cleaning the dismantled objects of the battery obtained through the crush/crack process with water or alcohol. The lithium ion battery contains organic solvents, such as ethylene carbonate, propylene carbonate, diethyl carbonate, and dimethyl carbonate, and the electrolyte, such as lithium hexafluorophosphate (LiPF$_6$). Therefore, by removing of the organic solvents and the electrolyte in advance, organic components, phosphorus (P), and fluorine (F) are prevented from being mixing in the leachate as impurities in the positive electrode active material exfoliation process described below.

Water or alcohol is used for cleaning of the dismantled objects of the battery, and the organic components and the electrolyte are removed by being shaken or stirred. As the alcohol, ethanol, methanol, isopropyl alcohol, or a mixed liquid thereof is used. While carbonates are typically insoluble to water, ethylene carbonate that is a component of the electrolyte solution is arbitrarily dissolved in water, and other organic components have some solubility to water. Therefore, carbonates can be cleaned by water.

It is preferable to iteratively clean the dismantled objects of the battery, and phosphorus, fluorine, and the like derived of the organic components and the electrolyte are removed by the cleaning process to an extent not to influence subsequent processes.

In the cleaning process, the electrolyte solution and the electrolyte contained in the battery are removed by cleaning with water or alcohol. Therefore, slurry is filtered after the cleaning treatment, and the cleaning liquid containing the electrolyte of lithium hexafluorophosphate and an electrolyte solution of ethylene carbonate and diethyl carbonate is discharged. That is, a cleaning liquid after the treatment, which contains components containing lithium of the electrolyte, the electrolyte solution, and the like, is discharged.

(Positive Electrode Active Material Exfoliation Process)

In the positive electrode active material exfoliation process, a positive electrode active material is exfoliated and separated from a positive electrode substrate by immersing of the dismantled objects of the battery obtained through the cleaning process in an acid solution, such as a sulfuric acid aqueous solution, an alkali solution, or a solution that contains surfactant. In this process, the positive electrode active material and an aluminum foil can be separated in a solid state by putting and stirring of the dismantled objects of the battery in an acid solution, such as a sulfuric acid aqueous solution, or a surfactant solution. Note that, in this process, all of the dismantled objects of the battery may be immersed in the sulfuric acid aqueous solution or the surfactant solution. However, only a positive electrode material portion may be selected from the dismantled objects of the battery, and be immersed.

When a sulfuric acid aqueous solution, for example, is used as the acid solution, pH of the solution is controlled to fall within a range of pH 0 to 3. An input amount of the dismantled objects of the battery to the sulfuric acid aqueous solution is 10 to 100 g/l. As the alkali solution, a sodium hydroxide solution, or the like can be used, and its additive amount is 0.3 to 1.0 N. Further, when the surfactant-containing solution is used, the type of surfactant is not especially limited, and nonionic surfactant, anionic surfactant, or the like can be used. An additive amount of the surfactant is 1.5 to 10 weight %, and pH of the surfactant solution preferably falls within a range of pH 5 to 9.

The dismantled objects of the battery having been subjected to the positive electrode active material exfoliation process are screened, and a positive electrode active material of lithium nickel oxide, lithium cobalt oxide, and the like separated from the positive electrode substrate, and things accompanying these are recovered. When all of the dismantled objects of the battery are processed, negative powder, such as graphite, which is a negative material, and things accompanying the negative power are also recovered.

Meanwhile, portions of the positive electrode substrate and the negative substrate, a portion of the packaging can made of aluminum, iron, and the like, a portion of the separator made of a resin film, such as a polypropylene porous film, a portion of the current collector made of aluminum or copper (Cu), and the like are separated and supplied to respective treatment processes.

In the positive electrode active material exfoliation process, by exfoliating the positive electrode active material from the dismantled objects of the battery by using the acid solution or the surfactant-containing solution, solid portions, such as the positive electrode active material and the aluminum foil, are separated. Meanwhile, a process liquid other than the solid portions, such as the acid solution, the alkali solution, or the surfactant solution used in the exfoliation treatment, is discharged as filtrate. In the filtrate, the electrolyte, the electrolyte solution, and the like that have not been removed in the cleaning process may be dissolved and contained.

Further, in the positive electrode active material exfoliation process, when the positive electrode active material is exfoliated by using the alkali solution, the used alkali solution may be used as alkali hydroxide to be added in the precipitate formation process described below in the lithium recovery. Accordingly, the valuable metals can be efficiently recovered from the lithium ion battery with low cost.

(Leaching Process)

In the leaching process, the positive electrode active material exfoliated and recovered in the positive electrode active material exfoliation process is leached in an acid solution and is made into slurry, in the presence of a fixed carbon-containing material, a metal having high reduction effect, or the like. By the leaching process, the positive electrode active material is dissolved in an acid solution, and nickel, cobalt, and the like that are the valuable metals constituting the positive electrode active material are made into metal ions.

As the acid solution used in dissolution of the positive electrode active material, an organic acid can be used, in addition to a mineral acid, such as sulfuric acid, nitric acid, or hydrochloric acid. Further, the acid solution to be used has at least pH 2 or less, and it is preferable to control pH to about 0.5 to 1.5 in consideration of reactivity.

(Sulfidation Process)

In the sulfidation process, the solution obtained through the leaching process is introduced to a reaction container, and a sulfidation agent is added, so that a sulfidation reaction is caused, and nickel/cobalt mixture sulfide is generated. This allows recovery of nickel and cobalt that are the valuable metals from the lithium ion battery. As the sulfidation agent, a sodium sulfide, a sodium hydrosulfide, or an alkali sulfide, such as a hydrogen sulfide gas, can be used.

To be specific, in the sulfidation process, a nickel ion (or a cobalt ion) contained in the solution obtained through the leaching process become a sulfide by a sulfidation reaction with an alkali sulfide according to a formula (1), (2) or (3).

$$Ni^{2+} + H_2S \Rightarrow NiS + 2H^+ \quad (1)$$

$$Ni^{2+} + NaHS \Rightarrow NiS + H^+ + Na^+ \quad (2)$$

$$Ni^{2+} + Na_2S \Rightarrow NiS + 2Na^+ \quad (3)$$

Addition of the sulfidation agent in the sulfidation process is performed until a point of time when change of ORP in the reaction solution does not happen by further addition of the sulfidation agent. Note that, typically, the reaction is completed within a range of −200 to 400 mV (a reference electrode: silver/silver chloride electrode). Further, the solution used in the sulfidation reaction has about pH 2 to 4. The temperature of the sulfidation reaction is, but not especially limited to, 0 to 90° C., preferably about 25° C.

Note that in the formulae (1) and (2), an acid is generated as the reaction proceeds, and the reaction is delayed. Therefore, to facilitate and complete the reaction, it is preferable to add an alkali, such as sodium hydroxide, in addition to the sulfidation agent, to neutralize the generated acid.

By causing the sulfidation reaction in the sulfidation process, nickel and cobalt that are the valuable metals contained in the positive electrode active material of the lithium ion battery can be recovered as a nickel/cobalt sulfide (sulfide precipitate).

As described above, when nickel and cobalt are recovered from the lithium ion battery, the solutions, such as the discharge liquid used in the discharge treatment in the discharge process, and the solution such as the cleaning liquid used for cleaning the dismantled objects of the battery and cleaning the electrolyte and the electrolyte solution in the cleaning process, are separated and discharged from the lithium ion battery. Further, the filtrate obtained through the sulfidation process to generate the nickel/cobalt mixture sulfide is separated and discharged from the lithium ion battery. These discharged solutions, such as the discharge liquid and the cleaning liquid, and the discharged filtrate of post-sulfidation process contain the electrolyte, such as lithium hexafluorophosphate, which constitutes the lithium ion battery. That is, the solutions and the filtrate are lithium-containing solutions containing lithium hexafluorophosphate. It is desirable to efficiently recover lithium from the lithium-containing solutions without mixing in the impurities of phosphorus and fluorine.

<2-2. Recovery of Lithium>

Therefore, in the present embodiment, a precipitate of impurities of phosphorus and fluorine is formed by raising pH of a solution, the solution being the lithium-containing solution containing lithium hexafluorophosphate, such as the process liquids including the discharged liquid and the cleaning liquid separated from the lithium ion battery, or the filtrate of post-sulfidation process. Then, after the formed precipitate is separated and removed, treatment to recover lithium from the filtrate is performed. This allows efficient removal of the impurities of phosphorus and fluorine based on lithium hexafluorophosphate contained in the discharge liquid and the cleaning liquid after the treatment, and lithium can be recovered without being contaminated by phosphorus and fluorine.

To be specific, the method for recovering lithium in the present embodiment includes a precipitate formation process of adding alkali hydroxide to the lithium-containing solution, such as the process liquids including the discharge liquid and the cleaning liquid containing lithium hexafluorophosphate separated from the lithium ion battery, or the filtrate of post-sulfidation process, to cause the solution to have pH 9 or more, and forming a precipitate of a phosphate and a fluoride salt, and a lithium recovery process of recovering lithium from the filtrate after separating and removing the precipitate formed in the precipitate formation process.

(Precipitate Formation Process)

In the precipitate formation process, a precipitate of a phosphate and a fluoride salt is formed from the lithium-containing solution containing lithium hexafluorophosphate, such as the process liquids including the discharge liquid and the cleaning liquid discharged in the process of recovering valuable metals from a lithium ion battery, or the filtrate of post-sulfidation process in which the nickel/cobalt mixture sulfide has been generated. In the present embodiment, by adding of alkali hydroxide to the solution, such as the discharge liquid and the cleaning liquid, and adjusting pH to 9 or more, the precipitate of a phosphate and a fluoride salt is formed.

As described above, while hexafluorophosphate ions in the solution are stable in the vicinity of neutrality, the hexafluorophosphate ions become hydrolyzed into phosphate ions and fluoride ions in a strong acid region or in a strong alkaline region. Therefore, by adding alkali hydroxide to the lithium-containing solution, such as the process liquids including the discharge liquid and the cleaning liquid, or the filtrate of post-sulfidation process, to cause the solution to have pH 9 or more, the hexafluorophosphate ions in the solution are hydrolyzed into the phosphate ions and the fluoride ions (hydrolysis treatment).

Then, the phosphate ions and the fluoride ions generated through the hydrolysis treatment form slightly soluble salts with the majority of metal ions. Therefore, the phosphate ions and the fluoride ions form a phosphate ($Li_3PO_4$) and fluoride salt (LiF) with lithium in the solution (precipitate formation treatment). By causing the phosphate ions and the fluoride ions to become slightly soluble salts, the precipitate of these slightly soluble salts are separated and removed, whereby phosphorus and fluorine can be efficiently removed from the solution.

Note that, as described below, when lithium is recovered by a solvent extraction method in a subsequent process, the lithium ions are extracted in an alkaline region when the solvent is extracted. Therefore, it is preferable to decompose the solution in an alkaline region rather than advancing the hydrolysis reaction in an acid region.

The alkali hydroxide added to the lithium-containing solution is not particularly limited. However, it is preferable to use sodium hydroxide, potassium hydroxide, or the like, in terms of economic performance. Especially, when a potassium hydroxide solution is used, even if not all of hexafluorophosphate ions in the solution are hydrolyzed and a part of the hexafluorophosphate ions is remained, a precipitate of potassium hexafluorophosphate ($KPF_6$) can be formed and separated. Therefore, the potassium hydroxide solution can be more preferably used. Further, when potassium hydroxide is used, the potassium hydroxide can slightly decreased the solubility of phosphorus and fluorine, compared with other alkali hydroxides. Therefore, the potassium hydroxide facilitates generation of a precipitate of phosphorus and fluorine, and can separate and remove the precipitate. The alkali hydroxide is added such that pH of the lithium-containing solution becomes 9 or more.

Note that, when exfoliation is performed by using the alkali hydroxide solution in the positive electrode active material exfoliation process in the process of recovering valuable metals, the alkali hydroxide solution of post-treatment may be reused in the precipitate formation treatment.

As the lithium-containing solution that is an object from which lithium is to be recovered, as described above, the process liquids, such as the discharged liquid and the cleaning liquid extracted in the process of recovering valuable metals from a lithium ion battery, or the filtrate of post-sulfidation process in which the nickel/cobalt mixture sulfide has been generated can be used. One type of these lithium-containing solutions may be used alone, or a plurality of types of the lithium-containing solutions may be used together.

To be specific, for example, the discharge liquid as the lithium-containing solution is a discharge liquid used for performing the discharge treatment when valuable metals are recovered from a lithium ion battery, as described above, and is a solution of sodium chloride, sodium sulfate, and the like. By performing of the discharge treatment to a used lithium ion battery by using the discharge liquid, lithium hexafluorophosphate that is an electrolyte component is contained in the discharge liquid discharged after the discharge treatment. That is, lithium is contained in the discharged liquid after the treatment.

Further, for example, the cleaning liquid as the lithium-containing solution is a cleaning liquid used for cleaning the dismantled objects of the battery after the used lithium ion battery is crushed and cracked, and is a solution of water, alcohol, or the like. By cleaning the dismantled objects of the battery by using the cleaning liquid, the electrolyte and the electrolyte solution contained in the dismantled objects of the battery are removed, and lithium hexafluorophosphate that is an electrolyte component is contained in the cleaning liquid discharged after the treatment. That is, lithium is contained in the cleaning liquid after the treatment.

Further, for example, the filtrate of post-sulfidation process as the lithium-containing solution is a filtrate obtained by separating the precipitate of a sulfide in the sulfidation process for generating nickel/cobalt mixture sulfide as described above. In the filtrate, lithium hexafluorophosphate that is an electrolyte component is contained, and that is, the filtrate is the lithium-containing solution.

The lithium-containing solution that is the process liquids including the discharge liquid and the cleaning liquid, or the filtrate of post-sulfidation process may be used as it is after recovery, and the hydrolysis treatment and the precipitate formation treatment of the hexafluorophosphate ions by addition of the alkali hydroxide may be performed. However, cleaning treatment may be performed by using water prior to the pH adjustment by addition of the alkali hydroxide. As described above, by cleaning of the recovered lithium-containing solution by water first, and adding of the alkali hydroxide to the cleaned solution, the precipitate of a phosphate and a fluoride salt suspended in the solution can be cleaned and removed. Accordingly, the recovered lithium can be effectively prevented from being contaminated by phosphorus and fluorine, and the precipitate can be prevented from being an obstacle when lithium is recovered, whereby lithium can be more efficiently recovered.

As described above, in the present embodiment, by adding of the alkali hydroxide in the precipitate formation treatment, pH of the lithium-containing solution is raised, the hexafluorophosphate ions contained in the solution are hydrolyzed, and the phosphate ions and the fluoride ions are formed. When the hydrolysis reaction ends, these phosphate ions and fluoride ions form the precipitate of lithium phosphate and lithium fluoride that are slightly soluble salts with lithium contained in the solution, even if a special additive agent is not used.

The precipitate formed in this way can be separated and removed by performing of a filtration operation. Therefore, in the precipitate formation treatment, phosphorus and fluorine that are impurities can be effectively removed from the lithium-containing solution, and lithium without mixing in of the impurities can be effectively recovered from the filtered solution, from which phosphorus and fluorine have been removed.

Note that, in this process, the total amount of lithium coprecipitated with phosphorus and fluorine is a small amount of the whole amount of lithium, and lithium can be separately recovered from the formed precipitate.

(Lithium Recovery Process)

In the lithium recovery process, the precipitate of a lithium phosphate and a lithium fluoride formed in the precipitate formation treatment is separated and removed, and then lithium is recovered from the filtrate. The method for recovering lithium from the filtrate is not especially limited. However, examples include a solvent extraction method and a carbonation method below.

A Solvent Extraction Method

As the method for recovering lithium from the filtrate, a solvent extraction method can be used, for example. An example of the solvent extraction method includes solvent extraction treatment to extract and separate lithium by using an acidic extractant.

To be specific, the solvent extraction treatment by using an acidic extractant, first, as an extraction process, adds an alkali solution to the filtrate to adjust the pH to 8 or more to 13 or less, and allowing the acidic extractant to be in contact with the filtrate to extract lithium ions. Next, as a stripping process, the solvent extraction treatment allows the acidic extractant that has extracted lithium ions to be in contact with an acid solution having pH 3 or less to strip the lithium ions.

As the acidic extractant used in the extraction process, 2-ethylhexyl phosphonic acid mono-2-ethylhexyl, di(2-ethylhexyl)phosphoric acid, bis (2,4,4 trimethyl-pentyl)phosphonic acid, a mixture of phenyl alkyl beta-diketone and trioctylphosphine oxide, or the like can be used, for example. Among them, it is especially preferable to use a phosphoric acid-based extractant, and for example, it is preferable to use di(2-ethylhexyl)phosphoric acid.

As the alkali solution added in the extraction process, a sodium hydroxide solution, a potassium hydroxide solution, a calcium hydroxide solution, a magnesium hydroxide solution, or the like can be used. By adding of these alkali solutions, pH of the filtrate is adjusted to 8 or more to 13 or less. When pH is lower than 8, an extraction rate of the lithium ions from the filtrate with the acidic extractant becomes low, and when pH is higher than 13, dissolution of the acidic extractant used for solvent extraction becomes remarkable. Therefore, by adjusting of pH to 8 or more to 13 or less, the lithium ions in the filtrate can be efficiently extracted.

The acidic extractant used in the extraction process has a characteristic to cause ion exchange with $H^+$, and to release the extracted metal ions, by causing pH to an acid side in the stripping process after metal ions are extracted in an alkaline region. Therefore, by allowing of the acidic extractant that has extracted the lithium ions in an alkaline region by addition of the alkali solution to be in contact with a solution adjusted to acidity, the lithium ions are stripped in the solution with a higher concentration than the concentration of the first extracted lithium-containing solution (about several g/l).

To be specific, in the stripping process, by allowing of the acidic extractant extracted in the extraction process to be in contact with the acid solution having pH 3 or less, ion exchange between the lithium ions and $H^+$ is caused and the lithium ions are taken in to the solution.

As the acid solution used in the stripping process, a sulfuric acid solution, a hydrochloric acid solution, or the like can be used. pH of the acid solution is adjusted to 3 or less, and is caused to be in contact with the acidic extractant that has extracted the lithium ions in the extraction process.

Further, in the stripping process, lithium hexafluorophosphate that has not hydrolyzed in the precipitate formation treatment and has been extracted in the extraction process with the lithium ions is decomposed, and a larger amount of lithium ions is stripped and can be taken in to the solution. That is, in the extraction process, the lithium ions are extracted by performing of the extraction treatment by using the acidic extractant. At this time, lithium hexafluorophosphate that has not been hydrolyzed and remained in the solution is extracted in the extractant together with the lithium ions due to influence of entrainment, and the like. Therefore, in the stripping process, by cleaning of the extractant with an acid solution, the extracted lithium hexafluorophosphate is separated into $Li^+$ and $PF_6^-$, and only the lithium ions can be stripped.

As described above, in the lithium recovery process, the lithium ions are extracted from the solution, such as the discharge liquid and the cleaning liquid containing lithium by using the solvent extraction method, for example, and the extracted lithium ions can be taken in to the solution.

Note that, in the solvent extraction method, a scrubbing process is provided after the extraction process with the acidic extractant, impurities extracted by the acidic extractant are removed with the acidic extractant, and the stripping process may then be performed. In the scrubbing process, known scrubbing treatment, such as allowing a dilute acid to be in contact with the solution, is performed. Accordingly, the impurities, such as iron, which has been extracted in the acidic extractant together with the lithium ions, can be separated and removed, and lithium of higher purity can be recovered in the stripping process.

Further, a carbon dioxide gas or a water-soluble carbonate is added to the stripping liquid including the lithium ions obtained by the solvent extraction method, the gas or the carbonate and the liquid are mixed and stirred, and lithium carbonate is deposited and lithium may be recovered. In this way, by further adding of a carbonate dioxide gas or a water-soluble carbonate to the extraction liquid including lithium ions as a carbonate fixation process (lithium carbonate deposition process), the extracted lithium can be recovered as a solid.

As the water-soluble carbonate used in the carbonate fixation process, a sodium carbonate solution or a calcium carbonate solution, or the like can be used. Further, the concentration of the solution carbonate is, but not limited to, 100 to 200 g/l, for example.

In the carbonate fixation process, the temperature of the stripping liquid containing the lithium ions is preferably 60 to 80° C. The lithium carbonate that is a carbonate of lithium has a different solubility from other salts, and when the temperature of the solution becomes higher, the solubility is drastically decreased. Therefore, by increasing of the temperature of a high-concentration lithium ion solution to 60° C. or more, the solubility of the lithium carbonate becomes lower than other salts, such as sodium sulfate having high solubility, and thus the lithium carbonate can be selectively precipitated as a crystal, and a lithium carbonate solid of high purity can be obtained. Note that it is better that the temperature of the high-concentration lithium ion solution be higher. However, when the temperature becomes higher than 80° C., typically, an operation becomes difficult from the viewpoint of heat resistance of a reaction vessel or peripheral devices, and the cost is increased. Therefore, the temperature is preferably set to 60 to 80° C.

Carbonation Method

Meanwhile, when the concentration of the lithium ions in the solution is high, for example, when lithium exceeding 1 g/l is contained in the solution, lithium can be recovered by performing of carbonation treatment to filtrate, from which the precipitate formed in the precipitate formation treatment has been separated and removed.

Examples of a carbonation agent used in the carbonation include water-soluble carbonates, such as a sodium carbonate solution and a potassium carbonate solution, and these water-soluble carbonates can be preferably used from the viewpoint of economic performance and availability. Especially, the potassium carbonate solution can be more preferably used in terms of high solubility and capability of decreasing the solubility of the crystal of the formed lithium carbonate.

Further, an additive amount of the carbonation agent added to the filtrate is not limited, and the solubility of the lithium carbonate can be decreased by common ion effect by excessive addition of an equivalent or more.

As described above, in the lithium recovery process, lithium in the filtrate can be efficiently recovered by using of the solvent extraction method or the carbonation method. Especially, in the present embodiment, the hexafluorophosphate ions are hydrolyzed and a precipitate of phosphorus and fluorine is formed as the precipitate formation treatment prior to the lithium recover process, and lithium is recovered from a filtrate from which the phosphorus and fluorine have been separated and removed. Therefore, the impurities of phosphorus and fluorine are not mixed in the recovered lithium, and lithium of high purity without contaminations can be efficiently recovered.

Note that phosphorus and fluorine have been effectively removed from the lithium recovered as a lithium carbonate, and the like. Therefore, by performing of double decomposition treatment, concentration, and crystallization with calcium hydroxide, and the like according to the rule, lithium hydroxide for lithium ion secondary battery can be easily generated.

3. Other Embodiments

The present invention is not limited to the above-described embodiments, and can be appropriately changed within a scope not to change the gist of the present invention.

To be specific, processes of recovering valuable metals from a lithium ion battery is not limited to the above processes, and may include other processes.

Further, as the lithium-containing solution, filtrate discharged from the positive electrode active material exfoliation process is used, other than the above-described process liquids or filtrate of post-sulfidation process, and alkali hydroxide is added to the filtrate and the filtrate is made to have pH 9 or more, a precipitate of a phosphate and a fluoride salt is formed, and lithium may be recovered. That is, in the positive electrode active material exfoliation process, while solid portions, such as a positive electrode active material and an aluminum foil, are separated, process liquids, such as an acid solution used in the exfoliation treatment and a surfactant solution, other than the solid portions, are discharged as the filtrate. In the filtrate, the electrolyte and the electrolyte solution that have not been removed in the cleaning process may sometimes be contained, and lithium is recovered. Therefore, this filtrate can be used as an object from which lithium is recovered.

EXAMPLES

4. Examples

Hereinafter, the present invention will be described using examples. However, the present invention is not limited to the examples.

(A Process of Recovering Valuable Metals from a Lithium Ion Battery)

First, to avoid danger of combustion, and the like, in the treatment, a used lithium ion battery was immersed in a sodium chloride solution of 100 g/L, which is a discharge liquid, and was made to be in a discharge state. Note that an end point of discharge was determined by absence of hydrogen by using a hydrogen gas sensor. After the discharge treatment, slurry was filtered, and a discharged discharge liquid was recovered. Then, the discharged lithium ion battery was dismantled into a size of 1 cm square or less by a biaxial crusher, and dismantled objects of the battery were obtained.

Next, the obtained dismantled objects of the battery were cleaned with water, and an electrolyte solution and an electrolyte contained in the dismantled objects of the battery were removed. After the cleaning treatment, the slurry was filtered, and the cleaning liquid (water) containing an electrolyte solution and an electrolyte was recovered.

Meanwhile, water containing 1.8 weight % of polyoxyethylene octylphenylether (the product name: EMULGEN series manufactured by Kao Corporation), which is surfactant, was added to solid portions separated with a screen from the dismantled objects of the battery of post-cleaning treatment. An exfoliation operation by stirring was performed, and a positive electrode active material was recovered.

The exfoliated positive electrode active material was leached with a sulfuric acid ($H_2SO_4$) solution of the concentration of 200 g/l, and nickel and cobalt that are valuable metals were leached. Next, as a sulfidation process, an obtained leachate was used, and sodium sulfide ($Na_2S$) was added to the leachate as a sulfidation agent, and nickel/cobalt mixture sulfide was obtained. After a precipitate of the nickel/cobalt mixture sulfide was separated, obtained filtrate was recovered.

(A Lithium Recovery Operation from a Discharge Liquid and a Cleaning Liquid)

Example 1

In the above-described operation of recovering valuable metals from a used lithium ion battery, by filtering of the slurry recovered after the discharge treatment and the cleaning treatment, and the slurry of post-sulfidation process, the process liquid made of the discharge liquid and the cleaning liquid of post-treatment and the filtrate of post-sulfidation process were obtained. Table 1 shows composition of the obtained solution.

TABLE 1

|  | Li | P | F |
|---|---|---|---|
| Composition of lithium-containing solution (g/l) | 5.3 | 0.4 | 1.3 |

As shown in Table 1, the solution contained lithium based on lithium hexafluorophosphate of a positive electrode active material. The following operation was continued by using the lithium-containing solution as an object from which lithium is recovered.

First, an 8 mol/l sodium hydroxide (NaOH) solution was added to the lithium-containing solution of 100 ml shown in Table 1, the solution was adjusted to have pH 9.5, and hexafluorophosphate ions contained in the solution were hydrolyzed. Then, the solution was stirred at room temperature until generation of a precipitate of the hydrolyzed phosphate ions or fluoride ions and lithium is completed. The generation of the precipitate ended after one hour, the generated precipitate was filtered. Table 2 shows composition of the filtrate obtained after the filtration.

TABLE 2

|  | Li | P | F |
|---|---|---|---|
| Composition of solution after alkali decomposition (g/l) | 3.9 | 0.1 | 0.2 |

As shown in Table 2, little phosphorus and fluorine were contained in the filtrate after the filtration. This can be considered that the hexafluorophosphate ions were hydrolyzed by increasing of pH by addition of the sodium hydroxide solution, and the phosphate ions and the fluoride ions generated by being hydrolyzed formed the precipitate of a phosphate and a fluoride salt with the lithium ions in the solution. It can be considered that, by removing of the precipitate, phosphorus and fluorine in the solution were able to be effectively separated and removed.

Next, an extraction solvent made of a mixed liquid 100 ml of 50 v/v % D2EHPA (manufactured by LANXESS K.K.) and 50 v/v % DIBK (manufactured by Kyowa Hakko Co., Ltd.) was added to the solution (filtrate) shown in Table 2, and solvent extraction treatment to extract lithium from the filtrate was performed. At that time, the 8 mol/l sodium hydroxide solution was added to the solution, the solution was mixed, and pH was adjusted to 11. After the adjustment of pH, an operation to add a new mixture of the extraction solvent when the extraction solvent was separated was repeated five times, and a solvent extraction operation was performed. With the operation, an extraction residual liquid of 120 ml was finally obtained. Table 3 shows composition of the obtained extraction residual liquid.

TABLE 3

|  | Li | P | F |
|---|---|---|---|
| Composition of extraction residual liquid after solution extraction (g/l) | 0.3 | 0.08 | 0.16 |

As shown in Table 3, 90.0% of lithium ions were able to be extracted with the extraction solvent. Phosphorus and fluorine were merely diluted 1.2 times, and precipitate or co-extraction was not found during the operation.

Next, the extracted solvents of five times were summed up, and after filtration, the solvent were stripped with 1 mold hydrochloric acid of 100 ml, having pH 3. Table 4 shows composition of the stripping liquid.

TABLE 4

|  | Li | P | F |
|---|---|---|---|
| Composition of stripping liquid after solution extraction (g/l) | 3.6 | <0.01 | <0.01 |

As shown in Table 4, the stripping liquid contained lithium of 3.6 g/l, and lithium was able to be taken into the solution. Further, detection values of phosphorus and fluorine were a lower detection limit (0.01 g/l) or less, and lithium was able to be efficiently recovered without contamination by phosphorus and fluorine.

Example 2

In Example 2, an operation was performed by a similar method to Example 1 except that an 8 mol/l potassium hydroxide (KOH) solution was used as the alkali hydroxide to be added instead of the sodium hydroxide solution in the hydrolysis treatment of the hexafluorophosphate ions by addition of alkali hydroxide and in the precipitate formation treatment in Example 1. Table 5 shows analysis values of the filtrate of post-hydrolysis treatment with the potassium hydroxide solution and a precipitate formation treatment.

TABLE 5

|  | Li | P | F |
|---|---|---|---|
| Composition of solution after addition of KOH (g/l) | 3.7 | 0.05 | 0.12 |

As shown in Table 5, when the potassium hydroxide solution was added, the solubility of a phosphate and a fluoride salt was able to be decreased, compared with the case where the sodium hydroxide solution was added in Example 1, and a precipitate of the slightly soluble salts was able to be efficiently removed. Therefore, the content of phosphorus and fluorine in the filtrate was able to be further decreased.

Example 3

In Example 3, after a solution made of the composition of Table 2 was obtained by the same method as Example 1, next, a sodium carbonate solution or a potassium carbonate solution was added until saturated, and lithium was recovered as a crystal of lithium carbonate by carbonation treatment. That is, different from Example 1, filtrate after precipitate treatment was subjected to the carbonation treatment instead of the solvent extraction treatment, and lithium was recovered. Table 6 shows analysis values of a mother liquor of post-carbonation treatment, and Table 7 shows the quality of a crystal of lithium carbonate.

TABLE 6

|  | Carbonation agent | Li | P | F |
|---|---|---|---|---|
| Composition of mother liquor after carbonation (g/l) | $Na_2CO_3$ | 0.4 | 0.08 | 0.16 |
|  | $K_2CO_3$ | 0.2 | 0.07 | 0.14 |

TABLE 7

|  | Carbonation agent | Li | P | F |
|---|---|---|---|---|
| Quality of crystal of lithium carbonate (%) | $Na_2CO_3$ | — | <0.01 | <0.01 |
|  | $K_2CO_3$ | — | <0.01 | <0.01 |

As shown in Tables 6 and 7, in the carbonation treatment, even when a sodium carbonate ($Na_2CO_3$) solution or a potassium carbonate ($K_2CO_3$) solution was used as a carbonation agent, detection values of phosphorus and fluorine contained in the crystal of lithium carbonate were a lower detection limit (0.01 g/l) or less, and lithium without containing the impurities of phosphorus and fluorine was able to be recovered as a carbonate.

As described above, by removing of phosphorus and fluorine to a solubility level prior to the recovery of lithium by the carbonation treatment, the solubility by addition of the water-soluble carbonate, such as sodium carbonate or potassium carbonate, is not decreased. Therefore, it was confirmed that the lithium carbonate was able to be recovered without contamination of phosphorus and fluorine.

As can be seen from the above examples, the alkali hydroxide is added to the discharge liquid and the cleaning liquid as the precipitate formation treatment, prior to the recovery of lithium of the solvent extraction treatment and the carbonation treatment and pH is raised, slightly soluble salts of a phosphate and a fluoride salt are formed, and phosphorus and fluorine are removed, whereby lithium can be recovered without contamination by phosphorus and fluorine.

Comparative Example 1

Meanwhile, in Comparative Example 1, a solvent extraction operation was directly performed to a solution shown in Table 1 recovered from a discharge liquid and a cleaning liquid without performing hydrolysis treatment by addition of alkali hydroxide and precipitate formation treatment like the above examples.

As a result, at a timing when pH was raised to 9 in a solvent extraction process, a large volume of a precipitate of a phosphate and a fluoride salt was generated and phase separation became difficult, and a large volume of the precipitate was mixed in to an organic phase from which lithium was extracted.

Comparative Example 2

Further, in Comparative Example 2, carbonation treatment was performed to a solution shown in Table 1 recovered from a discharge liquid and a cleaning liquid without performing hydrolysis treatment by addition of alkali hydroxide and precipitate formation treatment like the above examples.

As a result, in the vicinity of pH 9 where carbonation is started, a precipitate of a phosphate and a fluoride salt was generated, and the solution became muddy. Table 8 shows the quality of the generated carbonate precipitate.

TABLE 8

|  | Carbonation agent | Li | P | F |
|---|---|---|---|---|
| Quality of crystal of lithium carbonate (%) | $Na_2CO_3$ | — | 1.9 | 8.9 |
|  | $K_2CO_3$ | — | 2.0 | 9.2 |

As shown in Table 8, even when a sodium carbonate ($Na_2CO_3$) solution or a potassium carbonate ($K_2CO_3$) solution was used as a carbonation agent, the generated carbonate contains a large volume of phosphorus and fluorine, and only contaminated lithium can be recovered and did not satisfy the quality that can be used as a lithium compound for manufacturing a positive electrode active material again.

The invention claimed is:

1. A method for recovering lithium from a lithium-containing solution containing lithium hexafluorophosphate separated from a lithium ion battery, the method comprising:
    a precipitate formation process of adding alkali hydroxide to the lithium-containing solution to cause the lithium-containing solution to have pH 9 or more, and forming a precipitate of a phosphate and a fluoride salt; and
    a lithium recovery process of recovering lithium from filtrate after separating and removing the precipitate formed in the precipitate formation process.

2. The method for recovering lithium according to claim 1, wherein the alkali hydroxide is potassium hydroxide.

3. The method for recovering lithium according to claim 1, wherein the lithium recovery process includes
    an extraction process of adding an alkali solution to the filtrate to adjust pH to 8 to 13, and allowing an acidic extractant to be in contact with the filtrate to extract lithium ions, and
    a stripping process of allowing the acidic extractant having extracted the lithium ions in the extraction process to be in contact with an acid solution having pH 3 or less to strip the lithium ions.

4. The method for recovering lithium according to claim 3, wherein the lithium recovery process includes a scrubbing process of scrubbing the acidic extractant having extracted the lithium ions in the extraction process, and performs the stripping process after scrubbing.

5. The method for recovering lithium according to claim 4, wherein the lithium recovery process further includes a lithium carbonate deposition process of adding a carbon dioxide gas or a water-soluble carbonate to a stripping liquid containing the lithium ions obtained in the stripping process, and depositing a lithium carbonate.

6. The method for recovering lithium according to claim 1, wherein the lithium recovery process adds an alkali carbonate solution to the filtrate, and deposits a lithium carbonate to recover lithium.

7. The method for recovering lithium according to claim 1, wherein the precipitate formation process adds the alkali hydroxide to a lithium-containing solution that has been cleaned with water in advance.

* * * * *